Dec. 24, 1929.  R. H. KIPP  1,740,739
DETACHABLE CULTIVATOR SHOVEL
Filed July 6, 1926

Inventor:
Roy H. Kipp
By [signature]
Atty.

Patented Dec. 24, 1929

1,740,739

UNITED STATES PATENT OFFICE

ROY H. KIPP, OF CHICAGO, ILLINOIS, ASSIGNOR TO INTERNATIONAL HARVESTER COMPANY, A CORPORATION OF NEW JERSEY

DETACHABLE CULTIVATOR SHOVEL

Application filed July 6, 1926. Serial No. 120,554.

This invention relates to cultivator teeth and more particularly to a two-part cultivator shovel having a detachable point or blade.

It is an object of the invention to provide means for quickly and effectively centering and securing a cultivator shovel point to its support.

A further object of the invention is to provide an improved and simplified cultivator shovel which is effective in use and susceptible of economic manufacture.

Referring to the accompanying sheet of drawings, in which a structure is shown to illustrate the invention,—

Figure 1:
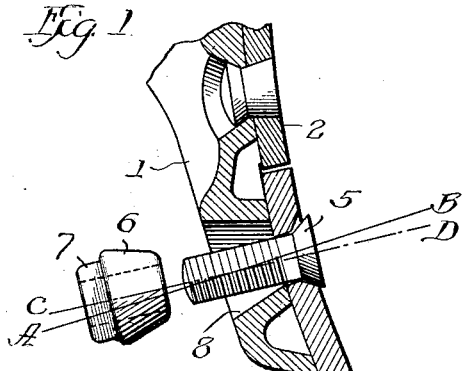
Figure 1 is a vertical section indicating the positions of the various parts of the shovel before the shovel-point is secured in operative position.
Figure 3:
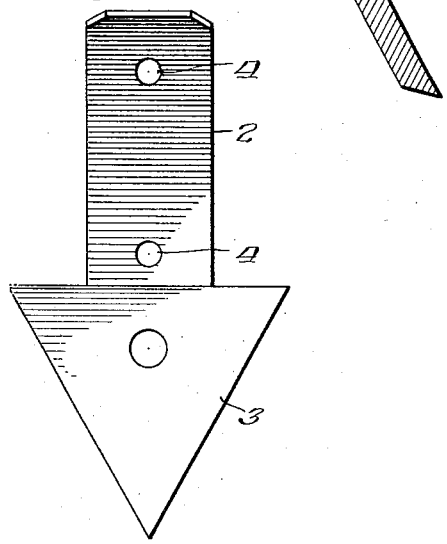
Figure 3 is an elevation showing the shank and the point of the illustrative cultivator shovel.
Figure 4:
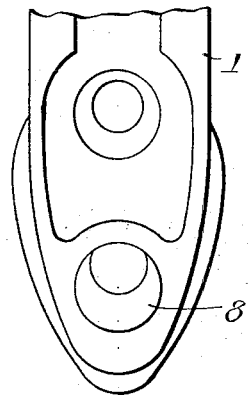
Figure 4 is a rear elevation showing a part of the standard to which the shank and the shovel-point are secured.
Figure 5:
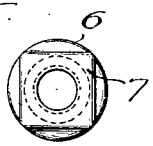
Figure 5 is a plan view of the cam nut used to secure the illustrative shovel-point in operative position.
Figure 6:
Figure 6 is an elevation of the cam nut shown in Figure 5.

The particular form of cultivator shovel herein used to illustrate the invention is a "spear head" shovel, as clearly indicated in Figure 3 of the drawings. It comprises a shank 2 and a point 3, both of which are adapted to be secured to a cultivator standard clamp or bracket 1. The point 3 is subjected to severe service and becomes worn before other parts of the structure. It is, therefore, necessary to make frequent replacements of this part, and it is necessary, while making such replacements, to see to it that the point 3 is properly centered with respect to the shank 2 and the bracket 1. It is also necessary that the point 3 be forced into tight engagement with the lower end of the shank 2 when the former is secured in place. Figure 1 of the drawings illustrates the position of the point 3 before it has been tightened into operating position on the bracket 1.

The cultivator shank 2 is permanently secured to the bracket by rivets 4, but, in order that the point may be easily replaceable, a bolt 5 is used to secure the point to the bracket. This bolt passes through the point and the bracket, as is well indicated in Figure 1 of the drawings. Preferably the front face of the point 3 is countersunk so as to enable the head of the bolt to come into such position that its outer surface will be in substantially the same plane as the central part of the point 3.

When the point 3 is to be secured in position, it is placed against the forward face of the bracket, as shown in Figure 1, and the bolt 5 is passed through the point and the tapered seat 8 in the lower end of the shank. When the point is put in this position, the shank is usually in substantially vertical position so that the weight of the point 3 causes the bolt to assume the position indicated in Figure 1, its longitudinal axis being indicated by the line C—D. The line A—B indicates the longitudinal axis of the bolt 5 when the point 3 is in its working position with its upper end tightly abutted against the shank 2.

Figure 2:
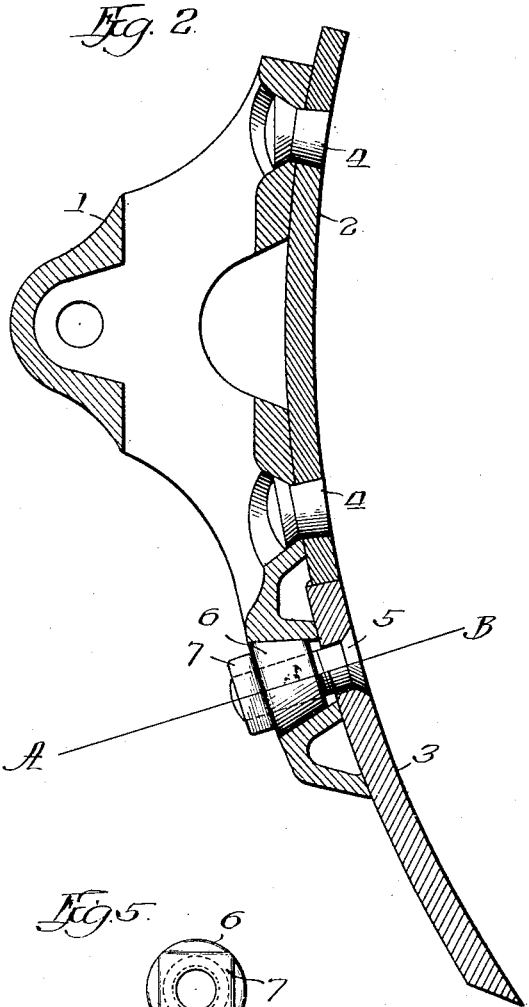
Figure 2 is a vertical section showing the parts of the illustrative cultivator shovel in assembled condition.

For the purpose of causing the point 3 to move from the position shown in Figure 1 to that shown in Figure 2, a cam herein shown as a frusto-conical nut 6 is used. This frusto-conical nut is so formed that its tapering surfaces will engage with the sides of the tapered seat 8 so as to properly center the point 3 upon the bracket and to force the point into tight engagement with the shank 2, as indicated in Figure 2 of the drawings.

Preferably the nut 6 is formed with a polygonal wrench receiving portion 7 in order that it may be easily forced within the tapered seat 8.

The movement of the point 3 from the position shown in Figure 1 to that shown in Figure 2 is promoted by constructing the cultivator bracket so that the longitudinal axis of the seat 8 is slightly offset with respect to the axis of the opening in the point.

While there has been shown and described one particular structure, it is to be understood that the invention is not limited thereto, but that it may be modified in accordance with the demands of service within the scope of the appended claims.

What I claim is:

1. In a tillage implement, a bracket, a shank secured to the bracket, a point detachably secured to the bracket below the shank, and a cam having an inclined face engaging said bracket and cooperating with means carried by the point to simultaneously force said point upwardly into tight engagement with said shank and backwardly into close contact with the bracket.

2. In a tillage implement, a bracket, a shank secured to the bracket, a point detachably secured to the bracket below the shank, a cam having an inclined face adapted to act on said bracket, and means connecting the cam and the point to enable the cam to simultaneously force said point upwardly into tight engagement with said shank and backwardly into close contact with the bracket.

3. In a tillage implement, a bracket, a shank secured to the bracket, a point detachably secured to the bracket below the shank, a bolt extending through the point and the bracket, and a threaded cam cooperating with said bolt and having an inclined face engaging the bracket to simultaneously force said point upwardly into tight engagement with said shank and backwardly into close contact with the bracket.

4. In a tillage implement, a bracket, a shank secured to the bracket, a point detachably secured to the bracket below the shank, and a cam nut having an inclined face engaging said bracket and cooperating with means carried by the point to simultaneously force said point upwardly into tight engagement with said shank and backwardly into close contact with the bracket.

5. In a tillage implement, a bracket, a shank secured to the bracket, a point detachably secured to the bracket below the shank, and a frusto-conical nut engaging said bracket and cooperating with means carried by the point to simultaneously force said point upwardly into tight engagement with said shank and backwardly into close contact with the bracket.

6. In a tillage implement, a bracket formed with a rearwardly presented frusto-conical socket, a shank secured to the bracket, a point detachably secured to the bracket below the shank, and means for clamping the point to the bracket including a frusto-conical cam seated in said socket.

7. In a tillage implement, a bracket formed with a rearwardly presented frusto-conical socket, a shank secured to the bracket, a point detachably secured to the bracket below the shank, a bolt extending through the point and the bracket, and a frusto-conical cam seated in said socket and acting on said bolt.

8. In a tillage implement, a bracket, a shank secured to the bracket so as to form thereon a downwardly presented shoulder, a point detachably secured to the bracket below the shank, a bolt extending through the point and the bracket, and a frusto-conical threaded cam nut having a squared end forming a wrench receiving boss, said nut being threaded upon the bolt and acting to simultaneously force said point upwardly tightly against said downwardly presented shoulders and backwardly into close contact with the bracket.

9. In a tillage implement, a bracket, a shank secured to the bracket, a point detachably secured to the bracket below the shank, and a cam having an inclined bottom face engaging said bracket and cooperating with means carried by the point to simultaneously force said point upwardly into tight engagement with said shank and backwardly into close contact with the bracket, said cam also having inclined side faces engaging the bracket to center the point transversely of the bracket.

In testimony whereof I affix my signature.

ROY H. KIPP.